(12) United States Patent
Lau (10) Patent No.: US 8,001,992 B2
(45) Date of Patent: Aug. 23, 2011

(54) LIQUID ENCLOSURE WITH AUTOMATIC AIR BLEEDING VALVE

(75) Inventor: Vincent W. S. Lau, Sai Kung (HK)

(73) Assignee: Ideal Time Consultants Limited, Tortola (VG)

(*) Notice: Subject to any disclaimer, the term of this patent is extended or adjusted under 35 U.S.C. 154(b) by 596 days.

(21) Appl. No.: 12/129,057

(22) Filed: May 29, 2008

(65) Prior Publication Data

US 2009/0294443 A1 Dec. 3, 2009

Related U.S. Application Data

(60) Provisional application No. 60/940,528, filed on May 29, 2007.

(51) Int. Cl.
*F16K 24/04* (2006.01)
(52) U.S. Cl. .......................... 137/202; 137/198
(58) Field of Classification Search ................ 137/198, 137/202
See application file for complete search history.

(56) References Cited

U.S. PATENT DOCUMENTS

| | | | | |
|---|---|---|---|---|
| 4,342,329 A | * | 8/1982 | Roff | 137/202 |
| 4,520,839 A | * | 6/1985 | Roff | 137/202 |

* cited by examiner

*Primary Examiner* — Craig Schneider
(74) *Attorney, Agent, or Firm* — St. Onge Steward Johnston & Reens LLC (57) ABSTRACT

A liquid enclosure has an automatic air bleeding valve which has a first stage wherein the fluid pathway is open and a one-way valve is interposed in the fluid pathway; a second stage wherein the fluid pathway is open and circumvents the one-way valve; and a third stage wherein the fluid pathway is closed. A float automatically transitions the valve from the first, then second, then third stage as a level of the liquid in the liquid holding chamber rises from below the first to above the second predetermined level, and the valve automatically returns from the third stage to the second stage, then to the first stage as the level of the liquid in the liquid holding chamber lowers from above the second to below the first predetermined level.

15 Claims, 6 Drawing Sheets

LIQUID ENCLOSURE WITH AUTOMATIC AIR BLEEDING VALVE

RELATED APPLICATIONS

This application claims the benefit of U.S. Provisional Application No. 60/940,528, filed May 29, 2007.

FIELD OF THE INVENTION

The invention pertains to the field of liquid enclosures having air bleeding valves, and in particular to liquid pumps.

BACKGROUND AND SUMMARY OF THE INVENTION

Liquid enclosures, and liquid pumps in particular, typically require "priming" prior to use, which is a known procedure whereby all or most of the air in the enclosure is replaced by a liquid. The removal of such air requires an opening in the enclosure through which the air may escape. The present invention provides a liquid enclosure having an automated air bleeding valve, as discussed in further detail below.

BRIEF DESCRIPTION OF THE DRAWINGS

For a complete understanding of the above and other features of the invention, reference shall be made to the following detailed description of the preferred embodiments of the invention and to the accompanying drawings, wherein.

DETAILED DESCRIPTION OF THE PREFERRED EMBODIMENTS

The present invention is suitable for liquid pumps for any use.

Referring to FIGS. 1-6, a liquid enclosure 10 constructed according to the present invention includes a body 12, a liquid holding chamber 14, and an air bleeding valve 16.

Figure 1:
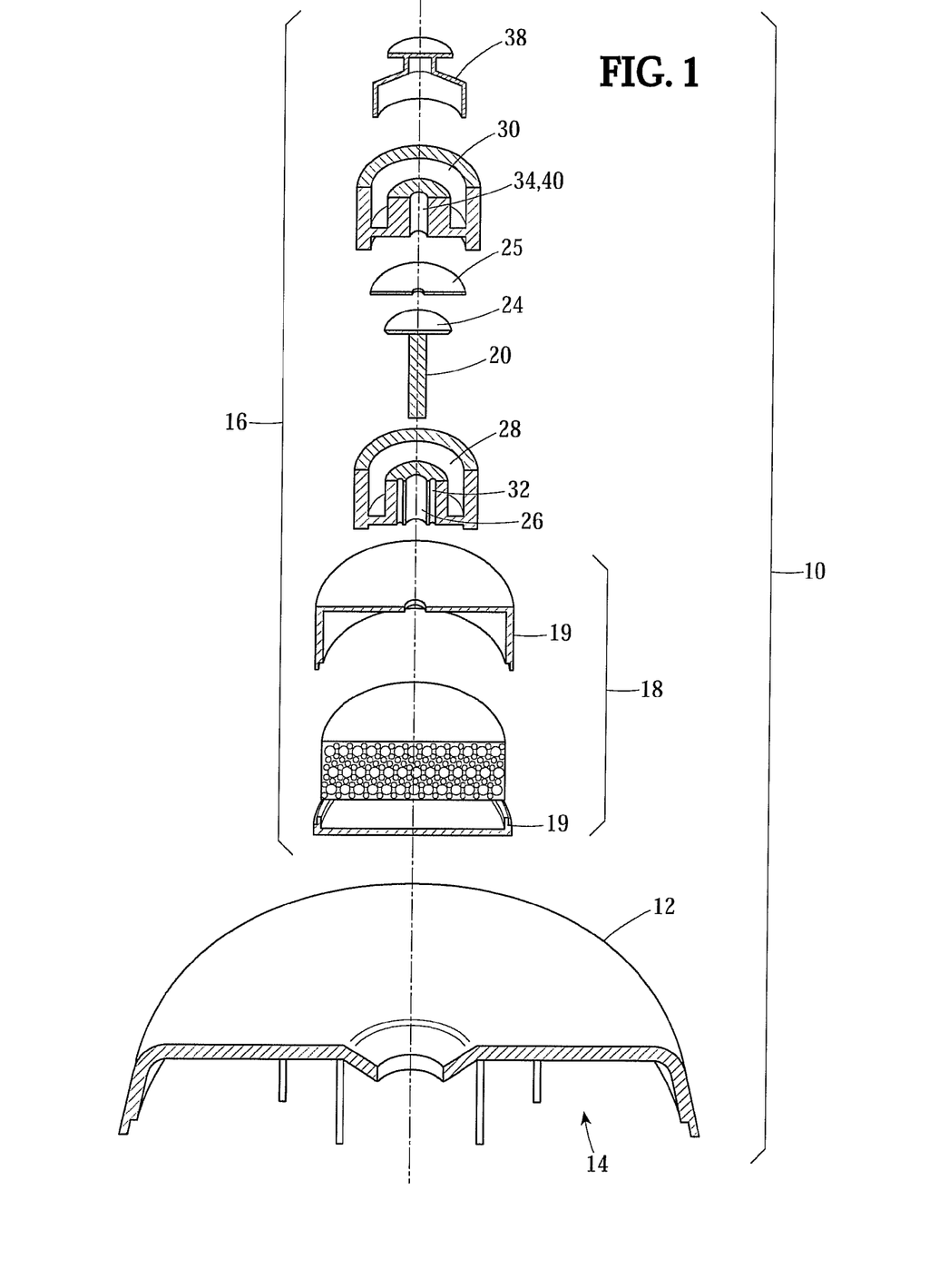
FIG. 1 is an exploded cross-sectional perspective view of a liquid enclosure having an automatic air bleeding valve, constructed according to the present invention.

The air bleeding valve 16 includes a float 18 within the liquid holding chamber 14, preferably having a protective cover 19, such as plastic. A shaft 20 is affixed to the float 18 at one end of the shaft, and a one-way valve 24 is affixed to an opposite free end portion of the shaft. The one-way valve 24 (and other parts of the liquid enclosure) may have a circular cross section, as shown in FIG. 1, which depicts the liquid enclosure 10 in a perspective view, with a cross section taken down the middle (diameter) of the structure.

Alternatively, the one-way valve 24 may be disposed on a sealing member affixed to the free end portion at the shaft 20. The sealing member has a fluid opening therethrough and a one-way valve 24 disposed over the fluid opening. The sealing member may be a substantially planar, relatively rigid (e.g., plastic or metal) disc and may have a plurality of fluid openings therethrough, all of which are covered by the one-way valve 24.

The shaft 20 is slidably supported by a shaft guide 26 affixed to the body 12 of the enclosure 10. Preferably, the shaft guide has an internal periphery closely surrounding a periphery of the shaft, such that no air (or no substantial amount of air) may pass between the shaft guide and the shaft. Preferably, the one-way valve 24 and/or sealing member has a horizontal cross section substantially greater than a corresponding cross section of the shaft guide 26 (and shaft 20), such that the one-way valve 24 and/or sealing member serve as a stop to prevent the float/shaft/sealing member assembly from disconnecting from the shaft guide 26.

The air bleeding valve 16 has first and second air bleeding chambers 28, 30. A first fluid passage 32 fluidly connects the liquid holding chamber 14 to the first air bleeding chamber 28. A second fluid passage 34 fluidly interconnects the first and second air bleeding chambers 28, 30. The second air bleeding chamber 30 leads to the ambient environment. Preferably, the first fluid passage 32 is disposed radially outwardly from the longitudinal axis of the shaft 20, and may comprise one or more separate fluid passages. Preferably, the second fluid passage 34 (or at least a proximate end thereof) is aligned substantially coaxially with the longitudinal axis of the shaft 20.

The air bleeding valve 16 may include a removable cap 38 disposed over a distal end 40 of the second fluid passage 34 to protect the valve from external contaminants. Preferably, the removable cap 38 seals the liquid enclosure 10 such that fluids or contaminants cannot enter the liquid enclosure during periods of non-use. The removable cap 38 may be disengaged by the user during use of the liquid enclosure 10.

The air bleeding valve 16 selectively forms a fluid pathway connecting the liquid holding chamber 14 to an ambient environment outside the liquid enclosure to bleed air from the liquid holding chamber.

Figure 2:
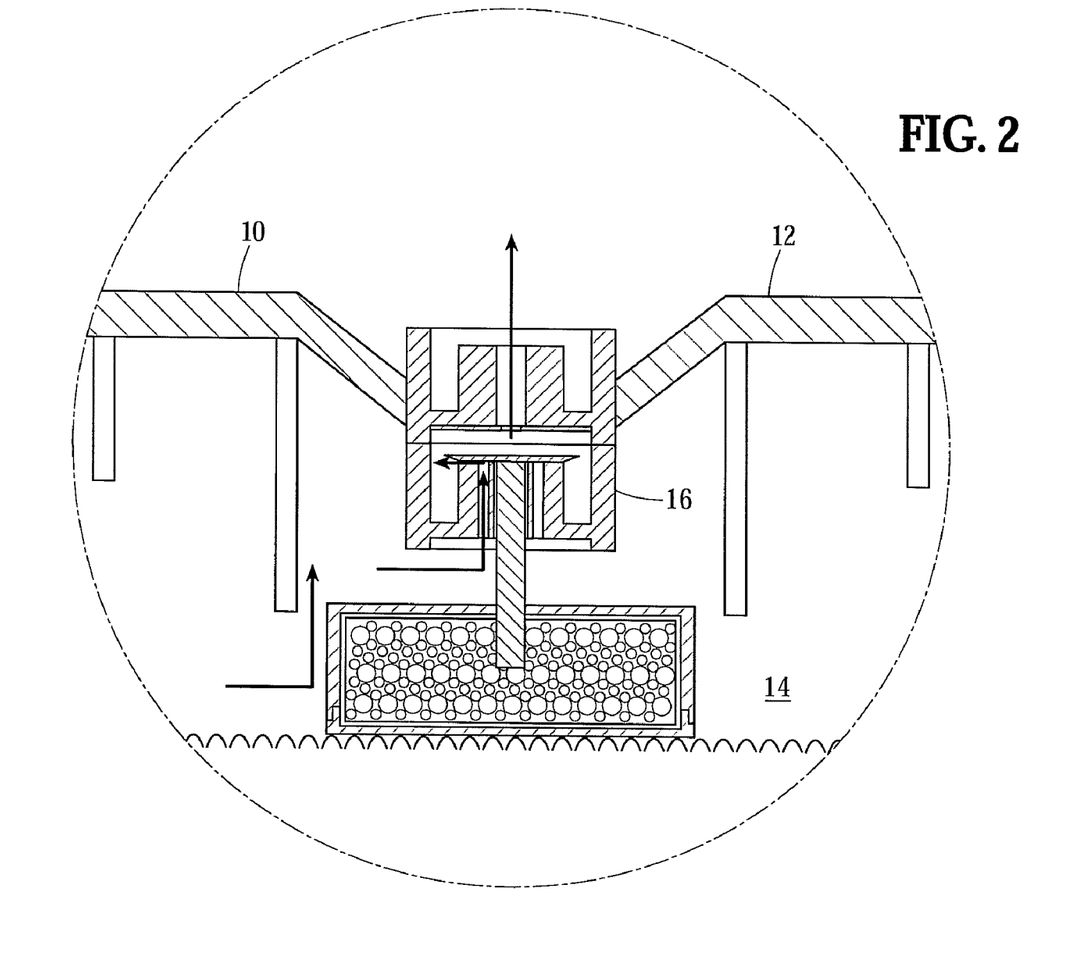
FIGS. 2-5 are close-up cross-sectional elevational views of the automatic air bleeding valve of the liquid enclosure of FIG. 1, showing the valve in first, second and third stages, respectively.
Figure 3:
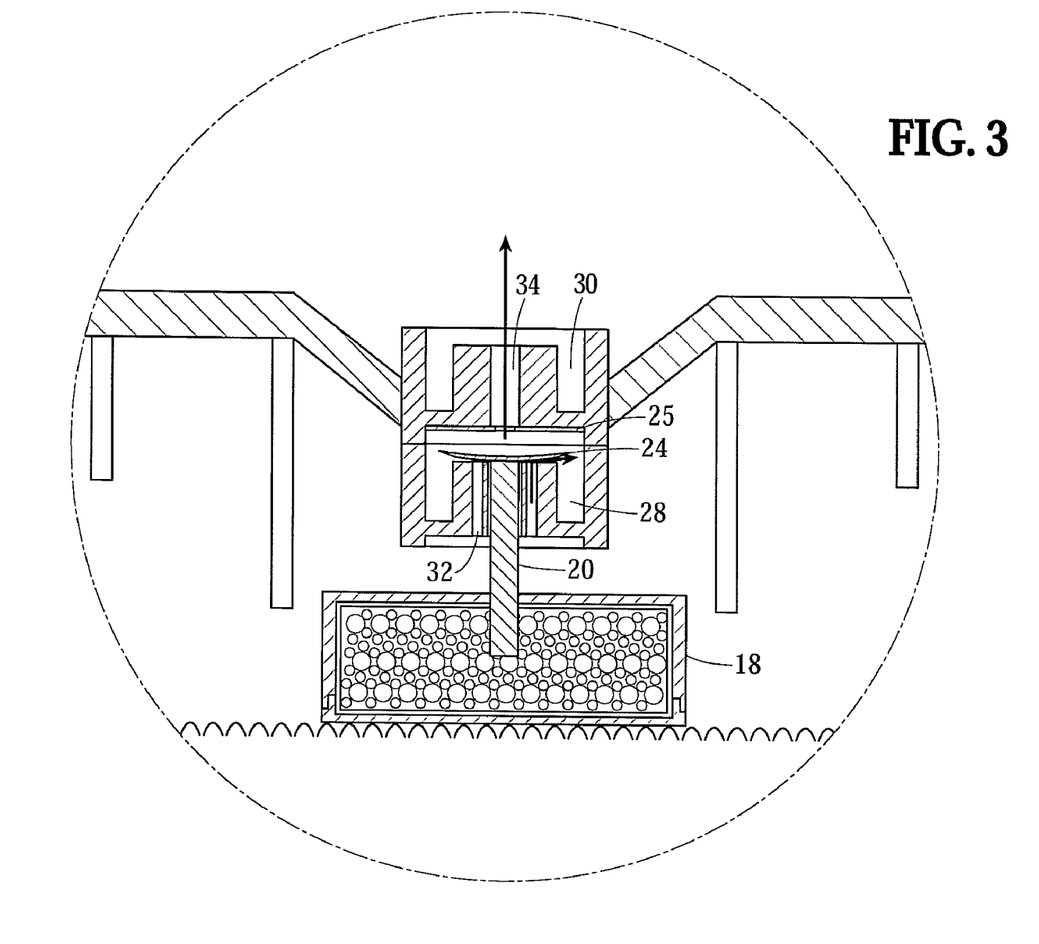

Referring to FIGS. 2-3, the air bleeding valve 16 is in a first stage when liquid in the liquid holding chamber is below a first predetermined level. When the air bleeding valve 16 is in the first stage, the fluid pathway is open and the one-way valve 24 is interposed in the fluid pathway. The one-way valve 24 permits air flow from the liquid holding chamber 14 toward the ambient environment and prevents air flow in an opposite direction.

Figure 4:
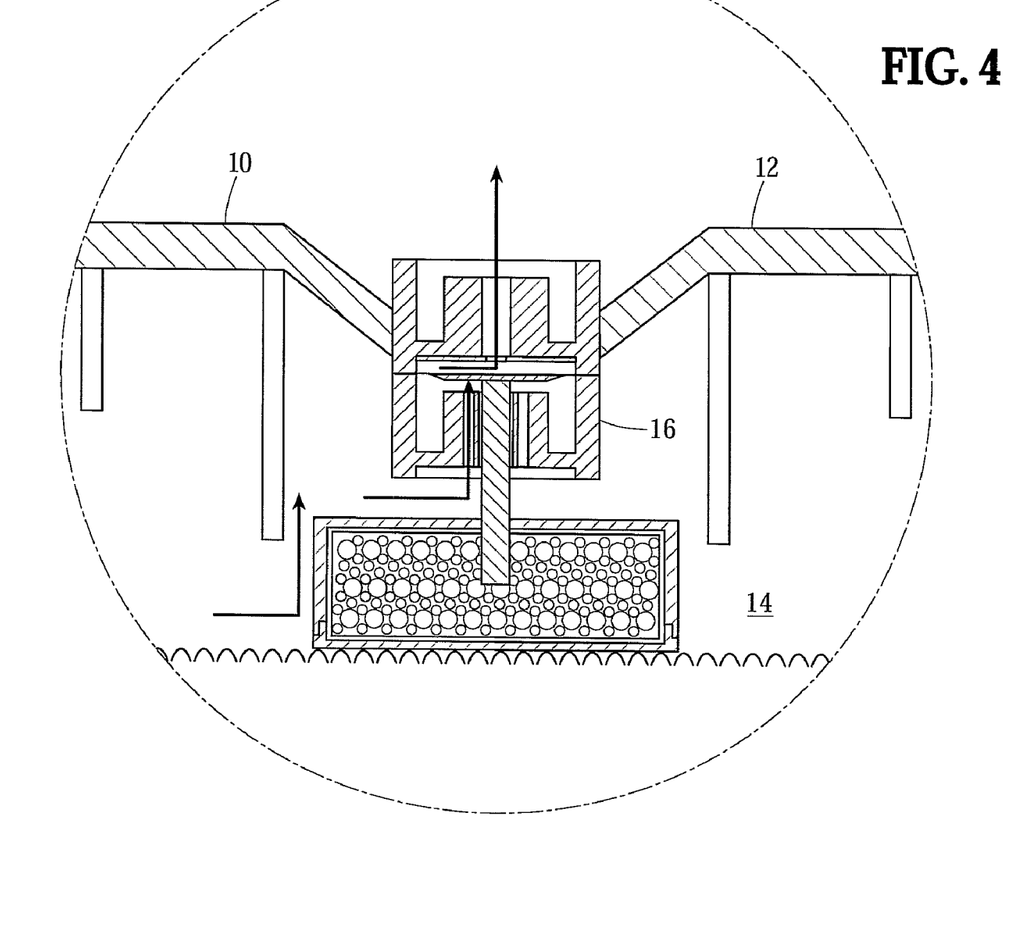
Figure 6:
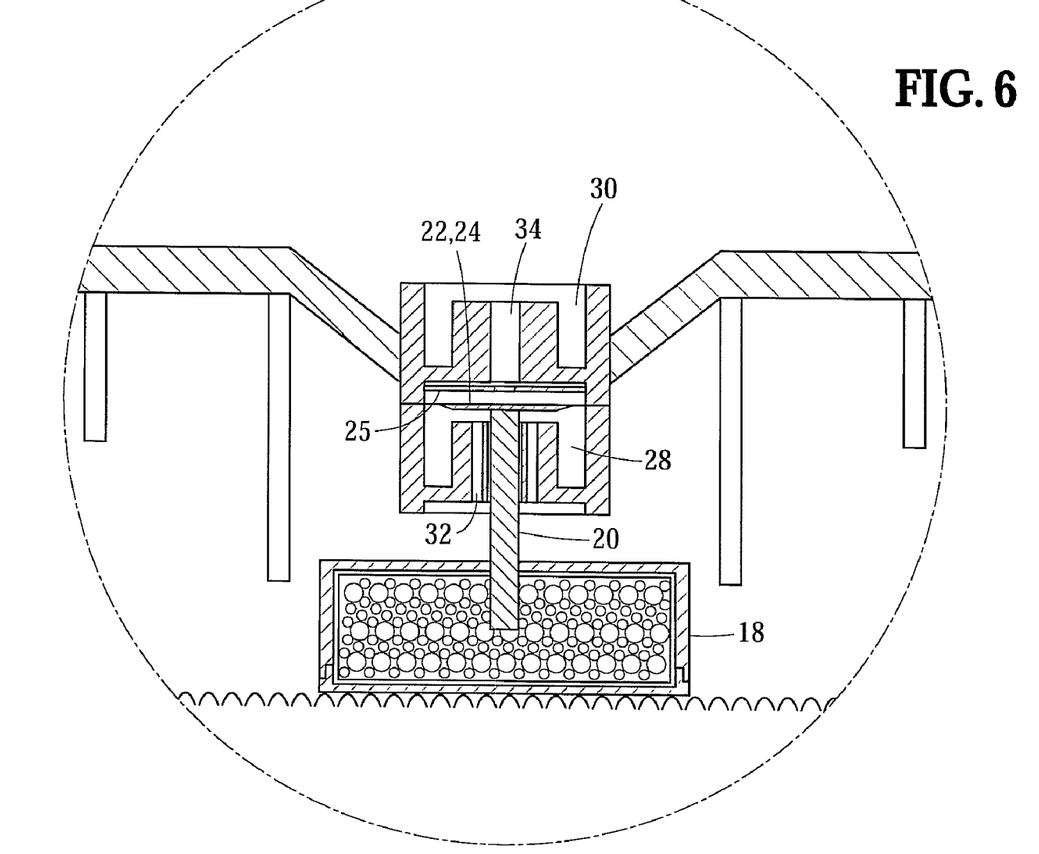
FIG. 6 is a close-up cross-sectional elevational view of the automatic air bleeding valve, showing the valve in the second stage.

Referring to FIGS. 4 and 6, the air bleeding valve 16 is in a second stage when the liquid is between the first predetermined level and a second predetermined level, which is higher than the first predetermined level. When the air bleeding valve 16 is in the second stage, the fluid pathway is open and does not include the one-way valve 24. Thus, in the second stage, the fluid pathway circumvents the one-way valve 24. It can be appreciated that the float/shaft/one-way valve assembly has a range of positions in the second stage.

Figure 5:
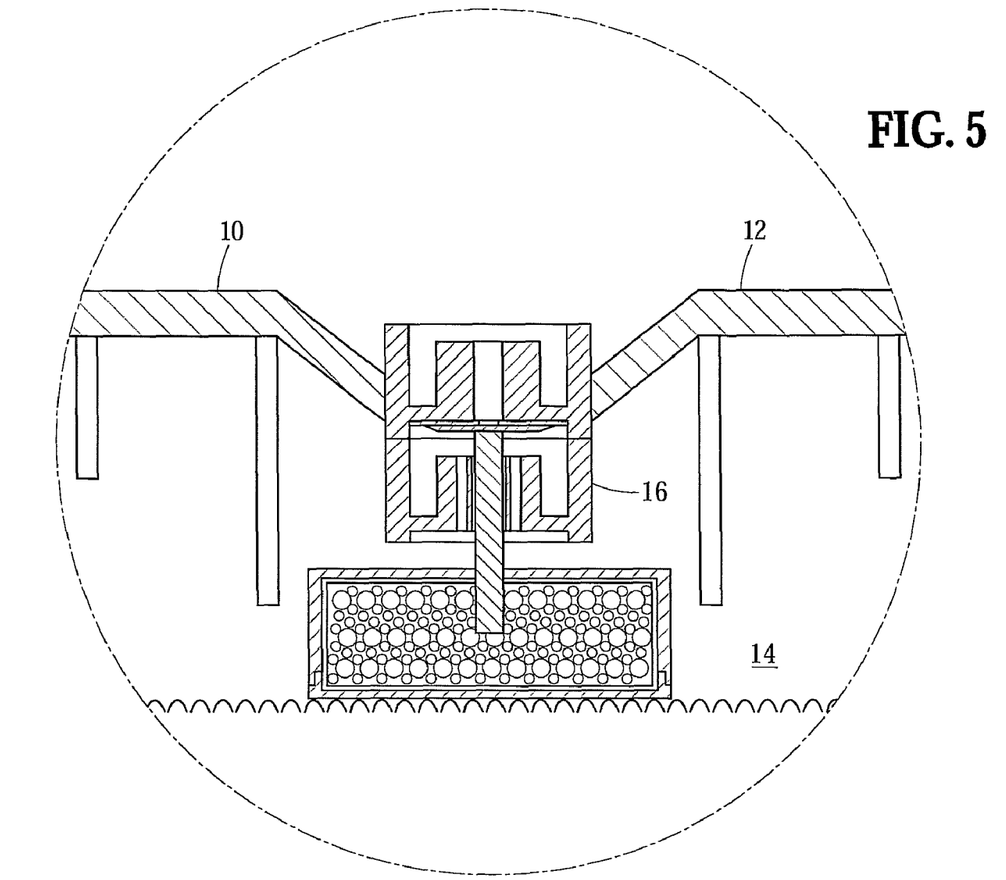

Referring to FIG. 5, the air bleeding valve 16 is in a third stage when the liquid is above the second predetermined level. When the air bleeding valve 16 is in the third stage, the fluid pathway is closed and air cannot escape from the liquid holding chamber 14 to the ambient environment, nor can air (or any other fluid) enter the liquid enclosure from the ambient environment through the air bleeding valve 16.

The air bleeding valve 16 operates automatically according to the level of the liquid in the liquid holding chamber 14. Specifically, the air bleeding valve 16 transitions from the first stage, to the second stage and then to the third stage as a level of the liquid in the liquid holding chamber 14 rises from below the first predetermined level to above the second predetermined level. Conversely, the air bleeding valve 16 returns from the third stage, to the second stage and then to the first stage as the level of the liquid in the liquid holding chamber 14 lowers from above the second predetermined level to below the first predetermined level.

The float 18 has a lowermost position and an uppermost position above the lowermost position. The float 18 is in the lowermost position when the liquid in the liquid holding chamber 14 is below the first predetermined level. The float 18 is in the uppermost position when the liquid in the liquid holding chamber 14 is above the second predetermined level. The float 18 is intermediate the lowermost and uppermost positions when the liquid in the liquid holding chamber 14 is between the first and second predetermined levels. The air bleeding valve 16 is in the first, second, and third stages when the float 18 is in the lowermost position, intermediate the lowermost and uppermost positions, and uppermost position, respectively.

The first and second air bleeding chambers 28, 30 form successive parts of the fluid pathway. The one-way valve 24 is disposed over one of the first and second fluid passages 32, 34 (preferably the first) when the air bleeding valve 16 is in the first stage, and one of the first and second fluid passages 32, 34 (preferably the second) is blocked by the one-way valve 24 when the valve is in the third stage.

Preferably, the air bleeding valve 16 includes a gasket 25 affixed to an upper surface of the first air bleeding chamber 28 against which the one-way valve 24 bears when the air bleeding valve is in the third stage.

When the air bleeding valve 16 is in the first stage, the one-way valve 24 is disposed over the first fluid passage 32, such that air may pass from the liquid holding chamber 14, through the first fluid passage 32, and through the one-way valve 24, toward the ambient environment.

When the air bleeding valve 16 is in the second stage, the one-way valve 24 is displaced from the first fluid passage 32, and the fluid pathway circumvents the one-way valve 24 (see FIG. 6).

The first air bleeding chamber 28 has a horizontal cross section greater than a corresponding horizontal cross section of the one-way valve 24 such that when the air bleeding valve 16 is in the second stage and the one-way valve 24 is displaced from the first fluid passage 32, air may flow from the first fluid passage 32, around the one-way valve 24 toward the second fluid passage 34.

When the air bleeding valve 16 is in the third state, the one-way valve 24 abuts the second fluid passage 34 and closes the second fluid passage 34 and the fluid pathway.

When the one-way valve 24 is disposed on top of a rigid sealing member affixed to the free end of the shaft, it is the sealing member that abuts the first fluid passage 32, and the fluid opening of the sealing member forms a continuation of the first fluid passage 32, such that air may pass from the liquid holding chamber 14, through the first fluid passage 32, through the fluid opening in the sealing member, and through the one-way valve 24, toward the ambient environment, when the air bleeding valve 16 is in the first stage.

In the second stage, the fluid pathway circumvents both the sealing member and the one-way valve 24, and the first air bleeding chamber has a horizontal cross section greater than a corresponding horizontal cross section of both the sealing member and the one-way valve 24.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

What is claimed is:

1. A liquid enclosure having an automatic air bleeding valve, comprising:
   a body having a liquid holding chamber;
   said air bleeding valve selectively forming a fluid pathway connecting said liquid holding chamber to an ambient environment outside said liquid enclosure for bleeding air from said liquid holding chamber;
   said air bleeding valve being in a first stage when a liquid in said liquid holding chamber is below a first predetermined level;
   when said air bleeding valve is in said first stage, said fluid pathway being open and a one-way valve being interposed in said fluid pathway, said one-way valve being operable to permit air flow from said liquid holding chamber toward said ambient environment and being operable to prevent air flow in an opposite direction;
   said air bleeding valve being in a second stage when said liquid is between said first predetermined level and a second predetermined level higher than said first predetermined level;
   when said air bleeding valve is in said second stage, said fluid pathway being open and circumventing said one-way valve;
   said air bleeding valve being in a third stage when said liquid is above said second predetermined level;
   when said air bleeding valve is in said third stage, said fluid pathway being closed;
   said air bleeding valve being operable to transition from said first stage, to said second stage and then to said third stage as a level of said liquid in said liquid holding chamber rises from below said first predetermined level to above said second predetermined level, and said air bleeding valve being operable to return from said third stage, to said second stage and then to said first stage as said level of said liquid in said liquid holding chamber lowers from above said second predetermined level to below said first predetermined level;
   said air bleeding valve including a float within said liquid holding chamber, said float having a lowermost position and having an uppermost position above said lowermost position;
   said float being in said lowermost position when said liquid in said liquid holding chamber is below said first predetermined level;
   said float being in said uppermost position when said liquid in said liquid holding chamber is above said second predetermined level;
   said float being intermediate said lowermost and uppermost positions when said liquid in said liquid holding chamber is between said first and second predetermined levels;
   said first, second, and third stages of said air bleeding valve being controlled by the position of said float; and
   said air bleeding valve being in said first stage when said float is in said lowermost position, being in said second stage when said float is intermediate said lowermost and uppermost positions, and being in said third stage when said float is in said uppermost position.

2. A liquid enclosure having an automatic air bleeding valve, as in claim 1, further comprising:
   said air bleeding valve comprising a first air bleeding chamber forming part of said fluid pathway;
   a first fluid passage fluidly connecting said first air bleeding chamber and said liquid holding chamber and a second fluid passage intermediate said first air bleeding chamber and the ambient environment;

said one-way valve being disposed over an opening of one of said first and second fluid passages when said air bleeding valve is in said first stage, and one of said first and second fluid passages being blocked when said valve is in said third stage.

3. A liquid enclosure having an automatic air bleeding valve, as in claim 2, further comprising:
said body having a shaft guide;
a shaft slidably disposed within said shaft guide;
said shaft having an end connected to said float, having a free end portion and said one-way valve being affixed to said free end portion;
when said air bleeding valve is in said first stage, said one-way valve being disposed over an opening of said first fluid passage, such that air may pass from said liquid holding chamber, through said first fluid passage, and through said one-way valve, toward said ambient environment;
when said air bleeding valve is in said second stage, said one-way valve being displaced from said opening of said first fluid passage; and
when said air bleeding valve is in said third stage, said one-way valve abutting said second fluid passage and closing said second fluid passage and said fluid pathway.

4. A liquid enclosure having an automatic air bleeding valve, as in claim 3, further comprising:
when said air bleeding valve is in said second stage, said fluid pathway circumventing said one-way valve.

5. A liquid enclosure having an automatic air bleeding valve, as in claim 4, further comprising:
said one-way valve being disposed in said first air bleeding chamber; and
said first air bleeding chamber has a horizontal cross section greater than a corresponding horizontal cross section of said one-way valve such that when said air bleeding valve is in said second stage and said one-way valve is displaced from said first fluid passage, air may flow from said first fluid passage, around said one-way valve toward said second fluid passage.

6. A liquid enclosure having an automatic air bleeding valve, as in claim 5, further comprising:
said one-way valve serving as a stop to prevent disengagement of said shaft from said shaft guide when a level of said liquid is below said first predetermined level.

7. A liquid enclosure having an automatic air bleeding valve, as in claim 3, further comprising:
said shaft guide having an internal periphery closely surrounding a periphery of said shaft; and
said one-way valve having a periphery disposed laterally outwardly from said internal periphery of said shaft guide.

8. A liquid enclosure having an automatic air bleeding valve, as in claim 7, wherein:
said shaft has a diameter greater than a diameter of a proximal end of said second fluid passage; and
said free-end portion of said shaft is substantially aligned with and covers said proximal end of said second fluid passage, when said valve is in said third stage.

9. A liquid enclosure having an automatic air bleeding valve, as in claim 3, further comprising:
a rigid sealing member affixed to said free-end portion of said shaft;
said sealing member having a fluid opening therethrough, and said one-way valve being affixed to said sealing member and disposed over said fluid opening;
when said air bleeding valve is in said first stage, said sealing member abutting said first fluid passage and said fluid opening of said sealing member forming a continuation of said first fluid passage, such that air may pass from said liquid holding chamber through said first fluid passage, through said fluid opening in said sealing member, and through said one-way valve, toward said ambient environment; and
when said air bleeding valve is in said second stage, said sealing member being displaced from said first fluid passage.

10. A liquid enclosure having an automatic air bleeding valve, as in claim 9, further comprising:
when said air bleeding valve is in said second stage, said fluid pathway circumventing both said fluid opening and said sealing member and said one-way valve.

11. A liquid enclosure having an automatic air bleeding valve, comprising:
a body having a liquid holding chamber;
said air bleeding valve selectively forming a fluid pathway connecting said liquid holding chamber to an ambient environment outside said liquid enclosure for bleeding air from said liquid holding chamber;
said air bleeding valve being in a first stage when a liquid in said liquid holding chamber is below a first predetermined level;
when said air bleeding valve is in said first stage, said fluid pathway being open and a one-way valve being interposed in said fluid pathway, said one-way valve being operable to permit air flow from said liquid holding chamber toward said ambient environment and being operable to prevent air flow in an opposite direction;
said air bleeding valve being in a second stage when said liquid is between said first predetermined level and a second predetermined level higher than said first predetermined level;
when said air bleeding valve is in said second stage, said fluid pathway being open and circumventing said one-way valve;
said air bleeding valve being in a third stage when said liquid is above said second predetermined level;
when said air bleeding valve is in said third stage, said fluid pathway being closed;
said air bleeding valve being operable to transition from said first stage, to said second stage and then to said third stage as a level of said liquid in said liquid holding chamber rises from below said first predetermined level to above said second predetermined level, and said air bleeding valve being operable to return from said third stage, to said second stage and then to said first stage as said level of said liquid in said liquid holding chamber lowers from above said second predetermined level to below said first predetermined level;
said air bleeding valve including a float within said liquid holding chamber, said float having a lowermost position and having an uppermost position above said lowermost position;
said float being in said lowermost position when said liquid in said liquid holding chamber is below said first predetermined level;
said float being in said uppermost position when said liquid in said liquid holding chamber is above said second predetermined level;
said float being intermediate said lowermost and uppermost positions when said liquid in said liquid holding chamber is between said first and second predetermined levels;
said air bleeding valve being in said first stage when said float is in said lowermost position, being in said second stage when said float is intermediate said lowermost and uppermost positions, and being in said third stage when said float is in said uppermost position;

said air bleeding valve comprising a first air bleeding chamber forming a part of said fluid pathway;

a first fluid passage fluidly connecting said first air bleeding chamber and said liquid holding chamber and a second fluid passage intermediate said first air bleeding chamber and the ambient environment;

said body having a shaft guide, and a shaft being slidably disposed within said shaft guide;

said shaft having an end connected to said float, having a free end portion and said one-way valve being affixed to said free end portion;

when said air bleeding valve is in said first stage, said one-way valve being disposed over an opening of said first fluid passage, such that air may pass from said liquid holding chamber, through said first fluid passage, and through said one-way valve, toward said ambient environment;

when said air bleeding valve is in said second stage, said one-way valve being displaced from said opening of said first fluid passage;

when said air bleeding valve is in said third stage, said one-way valve abutting said second fluid passage and closing said second fluid passage and said fluid pathway;

when said air bleeding valve is in said second stage, said fluid pathway circumventing said one-way valve;

said one-way valve being disposed in said first air bleeding chamber; and said first air bleeding chamber has a horizontal cross section greater than a corresponding horizontal cross section of said one-way valve such that when said air bleeding valve is in said second stage and said one-way valve is displaced from said first fluid passage, air may flow from said first fluid passage, around said one-way valve toward said second fluid passage.

12. A liquid enclosure having an automatic air bleeding valve, as in claim 11, further comprising:

said one-way valve serving as a stop to prevent disengagement of said shaft from said shaft guide when a level of said liquid is below said first predetermined level.

13. A liquid enclosure having an automatic air bleeding valve, comprising:

a body having a liquid holding chamber;

said air bleeding valve selectively forming a fluid pathway connecting said liquid holding chamber to an ambient environment outside said liquid enclosure for bleeding air from said liquid holding chamber;

said air bleeding valve being in a first stage when a liquid in said liquid holding chamber is below a first predetermined level;

when said air bleeding valve is in said first stage, said fluid pathway being open and a one-way valve being interposed in said fluid pathway, said one-way valve being operable to permit air flow from said liquid holding chamber toward said ambient environment and being operable to prevent air flow in an opposite direction;

said air bleeding valve being in a second stage when said liquid is between said first predetermined level and a second predetermined level higher than said first predetermined level;

when said air bleeding valve is in said second stage, said fluid pathway being open and circumventing said one-way valve;

said air bleeding valve being in a third stage when said liquid is above said second predetermined level;

when said air bleeding valve is in said third stage, said fluid pathway being closed;

said air bleeding valve being operable to transition from said first stage, to said second stage and then to said third stage as a level of said liquid in said liquid holding chamber rises from below said first predetermined level to above said second predetermined level, and said air bleeding valve being operable to return from said third stage, to said second stage and then to said first stage as said level of said liquid in said liquid holding chamber lowers from above said second predetermined level to below said first predetermined level;

said air bleeding valve including a float within said liquid holding chamber, said float having a lowermost position and having an uppermost position above said lowermost position;

said float being in said lowermost position when said liquid in said liquid holding chamber is below said first predetermined level;

said float being in said uppermost position when said liquid in said liquid holding chamber is above said second predetermined level;

said float being intermediate said lowermost and uppermost positions when said liquid in said liquid holding chamber is between said first and second predetermined levels;

said air bleeding valve being in said first stage when said float is in said lowermost position, being in said second stage when said float is intermediate said lowermost and uppermost positions, and being in said third stage when said float is in said uppermost position;

said air bleeding valve comprising a first air bleeding chamber forming a part of said fluid pathway;

a first fluid passage fluidly connecting said first air bleeding chamber and said liquid holding chamber and a second fluid passage intermediate said first air bleeding chamber and the ambient environment;

said body having a shaft guide, and a shaft being slidably disposed within said shaft guide;

said shaft having an end connected to said float, having a free end portion and said one-way valve being affixed to said free end portion;

when said air bleeding valve is in said first stage, said one-way valve being disposed over an opening of said first fluid passage, such that air may pass from said liquid holding chamber, through said first fluid passage, and through said one-way valve, toward said ambient environment;

when said air bleeding valve is in said second stage, said one-way valve being displaced from said opening of said first fluid passage;

when said air bleeding valve is in said third stage, said one-way valve abutting said second fluid passage and closing said second fluid passage and said fluid pathway;

said shaft guide having an internal periphery closely surrounding a periphery of said shaft;

said one-way valve having a periphery disposed laterally outwardly from said internal periphery of said shaft guide;

said shaft has a diameter greater than a diameter of a proximal end of said second fluid passage; and said free-end portion of said shaft is substantially aligned with and covers said proximal end of said second fluid passage, when said valve is in said third stage.

14. A liquid enclosure having an automatic air bleeding valve, comprising:
- a body having a liquid holding chamber;
- said air bleeding valve selectively forming a fluid pathway connecting said liquid holding chamber to an ambient environment outside said liquid enclosure for bleeding air from said liquid holding chamber;
- said air bleeding valve being in a first stage when a liquid in said liquid holding chamber is below a first predetermined level;
- when said air bleeding valve is in said first stage, said fluid pathway being open and a one-way valve being interposed in said fluid pathway, said one-way valve being operable to permit air flow from said liquid holding chamber toward said ambient environment and being operable to prevent air flow in an opposite direction;
- said air bleeding valve being in a second stage when said liquid is between said first predetermined level and a second predetermined level higher than said first predetermined level;
- when said air bleeding valve is in said second stage, said fluid pathway being open and circumventing said one-way valve;
- said air bleeding valve being in a third stage when said liquid is above said second predetermined level;
- when said air bleeding valve is in said third stage, said fluid pathway being closed;
- said air bleeding valve being operable to transition from said first stage, to said second stage and then to said third stage as a level of said liquid in said liquid holding chamber rises from below said first predetermined level to above said second predetermined level, and said air bleeding valve being operable to return from said third stage, to said second stage and then to said first stage as said level of said liquid in said liquid holding chamber lowers from above said second predetermined level to below said first predetermined level;
- said air bleeding valve including a float within said liquid holding chamber, said float having a lowermost position and having an uppermost position above said lowermost position;
- said float being in said lowermost position when said liquid in said liquid holding chamber is below said first predetermined level;
- said float being in said uppermost position when said liquid in said liquid holding chamber is above said second predetermined level;
- said float being intermediate said lowermost and uppermost positions when said liquid in said liquid holding chamber is between said first and second predetermined levels;
- said air bleeding valve being in said first stage when said float is in said lowermost position, being in said second stage when said float is intermediate said lowermost and uppermost positions, and being in said third stage when said float is in said uppermost position;
- said air bleeding valve comprising a first air bleeding chamber forming a part of said fluid pathway;
- a first fluid passage fluidly connecting said first air bleeding chamber and said liquid holding chamber and a second fluid passage intermediate said first air bleeding chamber and the ambient environment;
- said body having a shaft guide, and a shaft being slidably disposed within said shaft guide;
- said shaft having an end connected to said float, having a free end portion and said one-way valve being affixed to said free end portion;
- when said air bleeding valve is in said first stage, said one-way valve being disposed over an opening of said first fluid passage, such that air may pass from said liquid holding chamber, through said first fluid passage, and through said one-way valve, toward said ambient environment;
- when said air bleeding valve is in said second stage, said one-way valve being displaced from said opening of said first fluid passage;
- when said air bleeding valve is in said third stage, said one-way valve abutting said second fluid passage and closing said second fluid passage and said fluid pathway;
- a rigid sealing member affixed to said free-end portion of said shaft;
- said sealing member having a fluid opening therethrough, and said one-way valve being affixed to said sealing member and disposed over said fluid opening;
- when said air bleeding valve is in said first stage, said sealing member abutting said first fluid passage and said fluid opening of said sealing member forming a continuation of said first fluid passage, such that air may pass from said liquid holding chamber through said first fluid passage, through said fluid opening in said sealing member, and through said one-way valve, toward said ambient environment; and
- when said air bleeding valve is in said second stage, said sealing member being displaced from said first fluid passage.

15. A liquid enclosure having an automatic air bleeding valve, as in claim 14, further comprising:
- when said air bleeding valve is in said second stage, said fluid pathway circumventing both said fluid opening and said sealing member and said one-way valve.

* * * * *